(12) United States Patent
Han

(10) Patent No.: US 8,363,157 B1
(45) Date of Patent: Jan. 29, 2013

(54) MOBILE COMMUNICATION DEVICE WITH MULTIPLE FLASHPOINTS

(75) Inventor: Amy Han, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 36 days.

(21) Appl. No.: 13/249,109

(22) Filed: Sep. 29, 2011

Related U.S. Application Data

(63) Continuation of application No. 13/032,048, filed on Feb. 22, 2011.

(60) Provisional application No. 61/423,316, filed on Dec. 15, 2010.

(51) Int. Cl.
*H04N 5/222* (2006.01)

(52) U.S. Cl. .................. 348/371; 348/370; 348/373

(58) Field of Classification Search .................. None
See application file for complete search history.

(56) References Cited

U.S. PATENT DOCUMENTS

| | | | | |
|---|---|---|---|---|
| 5,649,238 | A * | 7/1997 | Wakabayashi et al. | 396/61 |
| 6,903,359 | B2 * | 6/2005 | Miller et al. | 250/559.36 |
| 7,385,641 | B2 * | 6/2008 | Ito | 348/370 |
| 7,603,031 | B1 * | 10/2009 | Viaud et al. | 396/159 |
| 7,712,907 | B2 * | 5/2010 | Zyka | 362/16 |
| 7,869,705 | B2 * | 1/2011 | Liu et al. | 396/164 |
| 2004/0136703 | A1 * | 7/2004 | Sasaki et al. | 396/30 |
| 2004/0165107 | A1 * | 8/2004 | Yip | 348/375 |
| 2004/0183940 | A1 * | 9/2004 | Raskar | 348/371 |
| 2004/0212725 | A1 * | 10/2004 | Raskar | 348/370 |
| 2008/0266445 | A1 * | 10/2008 | Park | 348/370 |
| 2009/0237208 | A1 * | 9/2009 | Tsukahara et al. | 340/5.82 |
| 2010/0039520 | A1 * | 2/2010 | Nanu et al. | 348/222.1 |
| 2010/0321498 | A1 * | 12/2010 | Kao | 348/151 |

FOREIGN PATENT DOCUMENTS
KR 826380 * 5/2008

OTHER PUBLICATIONS

'An LED Ring Flash for Compact Cameras' [online]. CNET News, 2008, [retrieved on Nov. 9, 2011]. Retrieved from the Internet: <URL: http://news.cnet.com/8301-17938_105-9911388-1.1html>. 4 pages.

Eisenberg, A. "What's Just Around the Bend? Soon, a Camera May Show You." The New York Times, Dec. 18, 2010, pp. 1-3. [Retrieved on Dec. 19, 2010]. Retrieved from the Internet: <URL: www.nytimes.com>.

'HTC EVO 4G Review: Hardware, Software, Specs, Features' [online]. Cellphones News, 2010, [retrieved on Nov. 9, 2011]. Retrieved from the Internet: <URL: http://gadgetwidgets.com/htc-evo-4g-review-hardware-software-specs-features/>. 5 pages.

(Continued)

*Primary Examiner* — Chieh M Fan
*Assistant Examiner* — Angel L Garces-Rivera
(74) *Attorney, Agent, or Firm* — Fish & Richardson P.C.

(57) ABSTRACT

A mobile communication device includes a wireless communication interface arranged to transmit and receive data with a wireless data network; a microprocessor in operable connection with memory storing one or more computer applications that include a digital image capture application; a housing at least partially surrounding the wireless communication interface and the microprocessor and defining an outer surface for the mobile communication device; a camera lens in an aperture in the housing and arranged on a first side of the wireless communication device and located at least partially in the housing, and serving as a centerpoint for an intersection of a pair of axes that define four quadrants; and a plurality of flash generating devices on the first side of, and on the outer surface of, the wireless communication device, two of the flash generating devices located in quadrants that are positioned opposite of, and not adjacent to, each other.

20 Claims, 6 Drawing Sheets

OTHER PUBLICATIONS

LG AX245 Bluetooth Camera Phone Comes to Alltel Wireless' [online]. Krunker.com, 2006, [retrieved on Nov. 9, 2011]. Retrieved from the Internet: <URL: http://www.krunker.com/2006/11/10/lg-ax245-bluetooth-camera-phone-comes-to-alltel-wireless/>. 4 pages.

Weatherproof High Resolution IR Zoom Camera [online]. Super Circuits, 2008, [retrieved on Nov. 9, 2011]. Retrieved from the Internet: <URL: http://www.supercircuits.com/Security-Cameras/Infrared-Security-Cameras/PC509HR>. 3 pages.

* cited by examiner

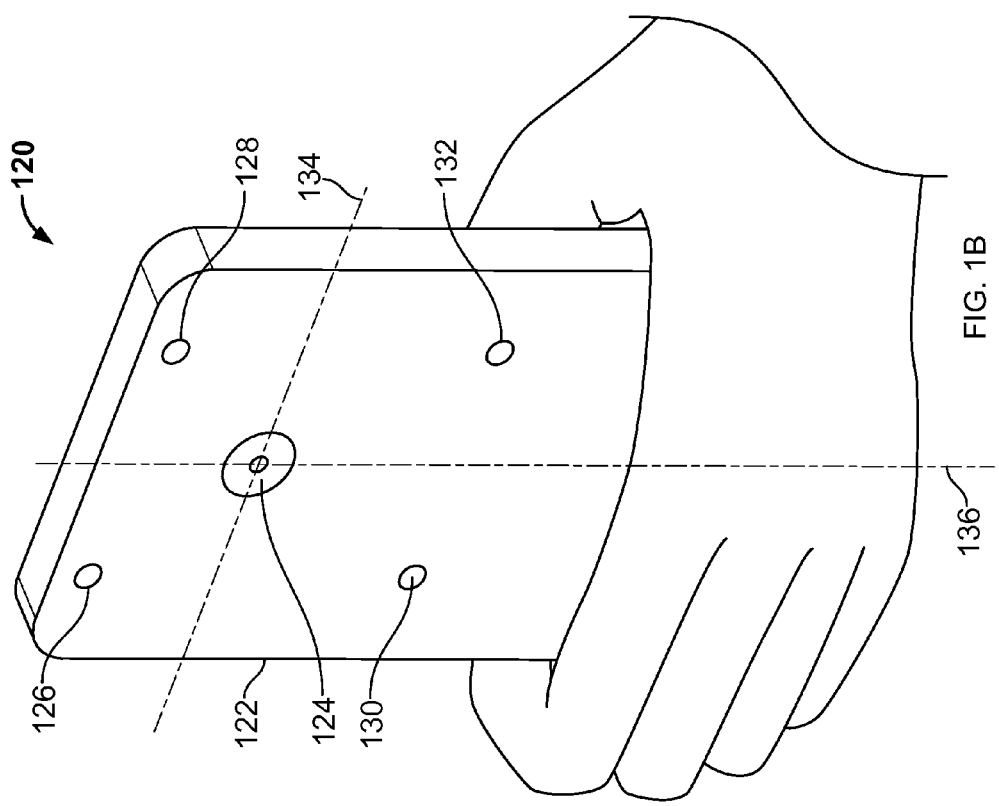
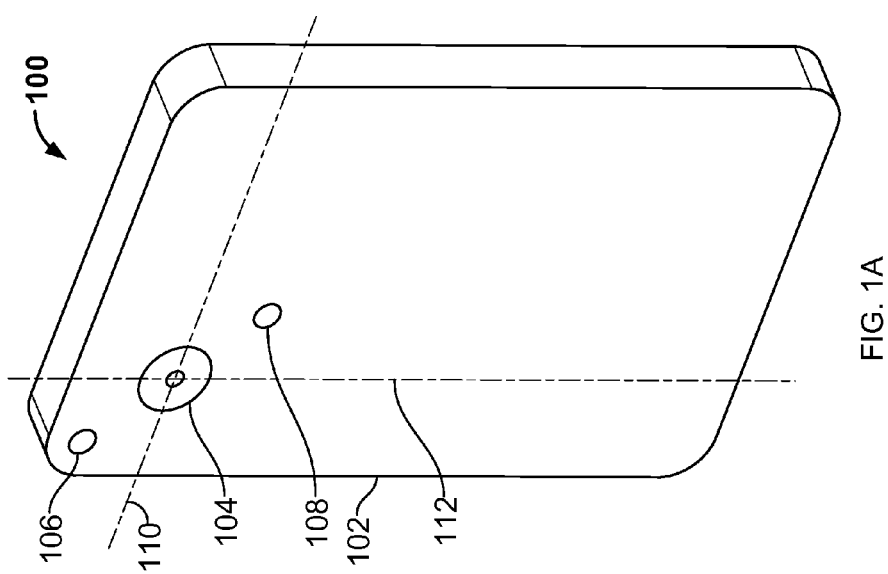

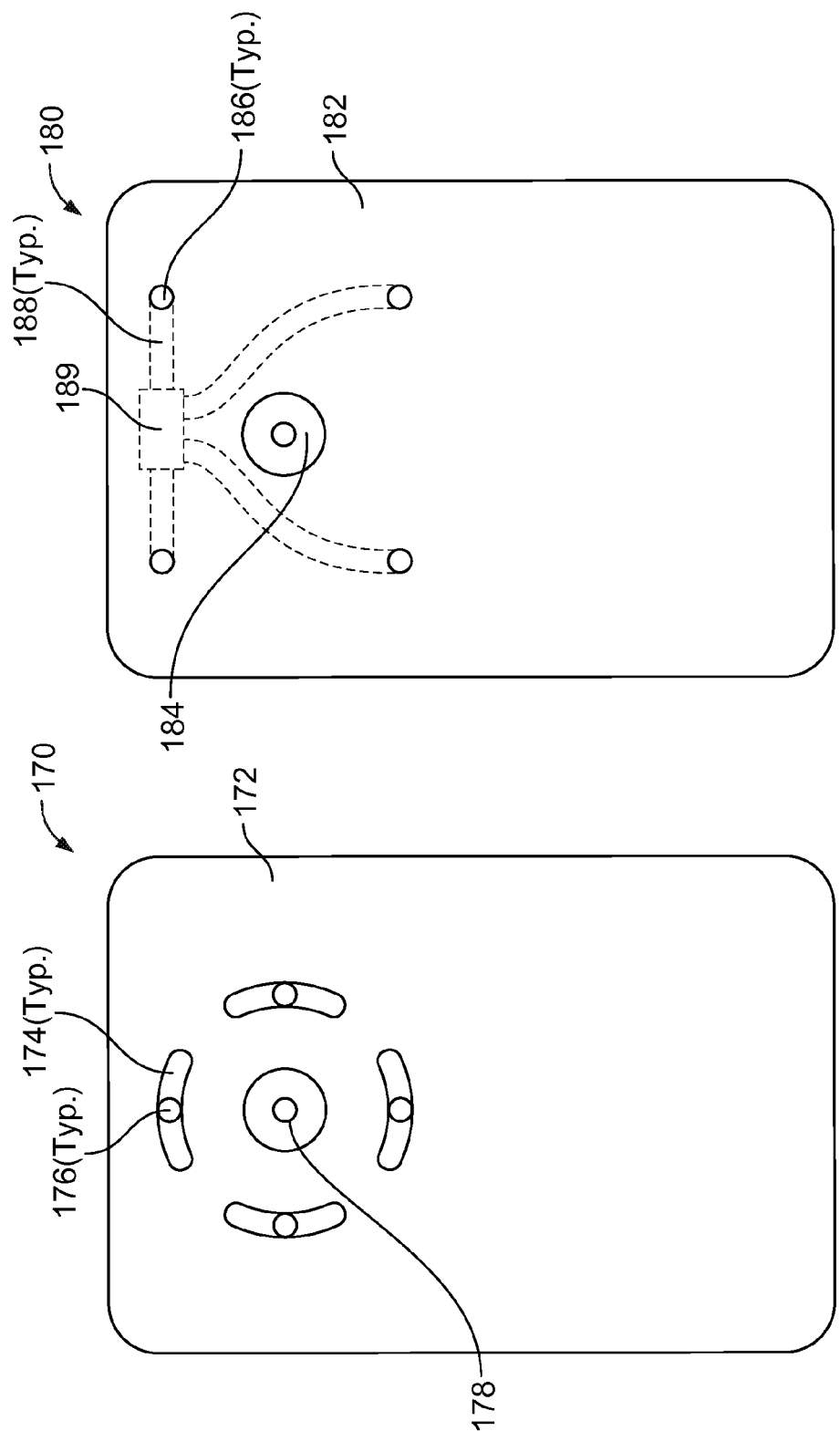

MOBILE COMMUNICATION DEVICE WITH MULTIPLE FLASHPOINTS

CROSS-REFERENCE TO RELATED APPLICATIONS

This application is a continuation of and claims priority under 35 U.S.C. §120 to U.S. application Ser. No. 13/032,048, filed on Feb. 22, 2011, which is a non-provisional of and claims priority to U.S. Provisional Application Ser. No. 61/423,316, filed on Dec. 15, 2010, the entire contents of which are hereby incorporated by reference

TECHNICAL FIELD

This document relates to flash mechanisms for digital cameras that are incorporated into mobile communication devices such as smartphones and tablet computers.

BACKGROUND

Mobile telephones and other mobile computing and communications devices continue to evolve and add features. Most feature phones and smartphones now include digital cameras that can capture digital images and communicate them to other devices, such as by email or by posting to a social networking web site. Certain smartphones may also be loaded with applications that permit a certain level of image editing on the device, such as red-eye reduction and the like. In addition, some devices are provided with LED flashes that are triggered in coordination with the capturing of an image so as to provide fill lighting in low-light conditions.

SUMMARY

This document describes systems and techniques for capturing digital images with a portable communication device that has a plurality of spaced-apart flashpoints. The flashpoints may be located away from a camera lens on a device housing and may be located on opposite sides of the lens so as to reduce shadows that may be cast by the flashpoints when a picture or pictures are taken.

Also, a control system in a mobile device may be arranged to control the triggering of the flashpoints and the capturing of images so as to sequentially trigger the flashpoints and to capture one image with each such triggering. Where such sequential action is performed in quick succession, multiple images may be captured of an identical subject (i.e., where the "subject" is the primary thing in the field of view of the camera when the image is captured), but each image may throw a different shadow.

Such multiple images may be processed in various manners, including on the mobile device itself or on a separate computer system, to form visually interesting composite images. For example, images that have high dynamic range can be produced by capturing multiple images of a single subject under different lighting conditions and exposure settings. Such images may appear to have greater color, contrast, or depth than a regular single image of the group would have.

In one implementation, a mobile communication device is disclose that comprises a wireless communication interface arranged to transmit and receive data with a wireless data network; a microprocessor in operable connection with memory storing one or more computer applications that include a digital image capture application; a housing at least partially surrounding the wireless communication interface and the microprocessor and defining an outer surface for the mobile communication device; a camera lens in an aperture in the housing and arranged on a first side of the wireless communication device and located at least partially in the housing, and serving as a centerpoint for an intersection of a pair of axes that define four quadrants; and a plurality of flash generating devices on the first side of, and on the outer surface of, the wireless communication device, two of the flash generating devices located in quadrants that are positioned opposite of, and not adjacent to, each other. Each of four quadrants can include a flash generating device, and the housing can define a periphery around an edge of the first side of the communication device, with the flash generating devices located closer to the periphery than to the camera lens. In addition, each of the plurality of flash generating devices can be provided with light from a common source via light pipes.

In certain aspects, the device also comprises a flash controller arranged to trigger the flash generating devices individually in succession to each other, and an image capture application to capture a digital image for each triggering of one of the flash generating devices. The device may also include an image processing application loaded on the device and programmed to merge portions of the captured digital images by analyzing data created by positioning of each of the flash generating devices. The image processing device can be programmed to perform high dynamic range (HDR) imaging to create a single HDR image using a plurality of images. Also, the image processing device can be programmed to create a three-dimensional representation of a subject of the plurality of images using shadow information from shadows cast in different areas in particular ones of the plurality of images.

In other aspects, the device additionally includes light pipes connecting the flash generating devices to one or more light sources. The light pipes can connect to a single light source. Also, the device can be programmed to select one or more of the plurality of flash generating devices to activate based on an electronic analysis of lighting on a prospective subject of a photograph.

In another implementation, a computer-implemented digital image capture method is disclosed, and comprises providing a wireless communication device having a housing, a digital camera mounted in or on a first surface of the housing, and a plurality of flash generating devices at the first surface of the housing, wherein particular ones of the plurality of flash generating devices are located in opposed quadrants defined by imaginary lines that pass at right angles to each other through the lens and substantially in a plane of the first surface of the housing; receiving a user trigger to take a picture of a subject with the digital camera; and automatically activating the particular ones of the plurality of flash generating devices in coordination with capturing one or more images of the subject with the digital camera. The plurality of flash generating devices can define vertices of a right polygon around the lens, and can be located at respective corners of a rectangle. One or more of the flash generating devices can also be movable away from and toward the lens.

In certain aspects, automatically activating the particular ones of the plurality of flash generating devices comprises sequentially activating particular ones of the plurality of flash generating devices in coordination with capturing a plurality of images with the camera. In such a situation, the plurality of images can be captured in less than one second and can include four or more images captured in one second or less. The method can additionally comprise processing the plurality of images to create a single composite image, which can be performed on the wireless communication device. The method can additionally comprise automatically selecting with the mobile communication device one or more of the plurality of flash generating devices to activate based on an electronic analysis of lighting on a prospective subject of a photograph to be taken by the mobile communication device.

In yet another implementation, a mobile communication device is disclosed that comprises a wireless communication interface arranged to transmit and receive data with a wireless data network; a microprocessor in operable connection with memory storing one or more computer applications that include a digital image capture application; a housing at least partially surrounding the wireless communication interface and the microprocessor and defining an outer surface for the mobile communication device; a camera lens located on a first side of the wireless communication device at least partially in the housing, and serving as a centerpoint for an intersection of a pair of axes that define four quadrants; and means on opposed sides of the camera lens for providing flash illumination of a subject at which the camera lens is directed. The means for providing flash illumination can comprise a plurality of flashpoints, and the device can further comprise means for sequentially energizing the plurality of flashpoints in coordination with image capture by the digital image capture application.

The details of one or more embodiments are set forth in the accompanying drawings and the description below. Other features and advantages will be apparent from the description and drawings, and from the claims.

DESCRIPTION OF DRAWINGS

FIGS. 1A-1F show example mobile devices having various flash configurations.

Like reference symbols in the various drawings indicate like elements.

DETAILED DESCRIPTION

This document discusses systems and techniques that may be used to capture images on a computing device using a digital camera, where the quality of the images may be improved by using multiple distributed flashpoints. A flashpoint is a location at which a flash of light appears in coordination with the capturing of an image by a digital or other form of camera. Generally, a flashpoint occurs where a light source, such as an LED light source, a flashbulb, or an electronic light flash, is located. A flashpoint may also be located remotely from the light source, such as when light generated by the light source is captured at a first end of an optical fiber or other form of light pipe, and exits an opposite end of the light pipe at a position away from where the light source is located.

Various embodiments discussed here placed flashpoints on opposed sides of a camera lens on a device such as a smartphone, to improve the quality of an image by reducing shadows that would otherwise appear if only a single flashpoint, or multiple flashpoints in a closely clustered arrangement, were used. The use of multiple distributed flashpoints in such a manner may generate benefits like those received from using a traditional ring flash, which is an item that may be attached at the distal end of the lens of a single lens reflex (SLR) or similar camera as an accessory, and is frequently used for close-up photography.

Figure 1D:
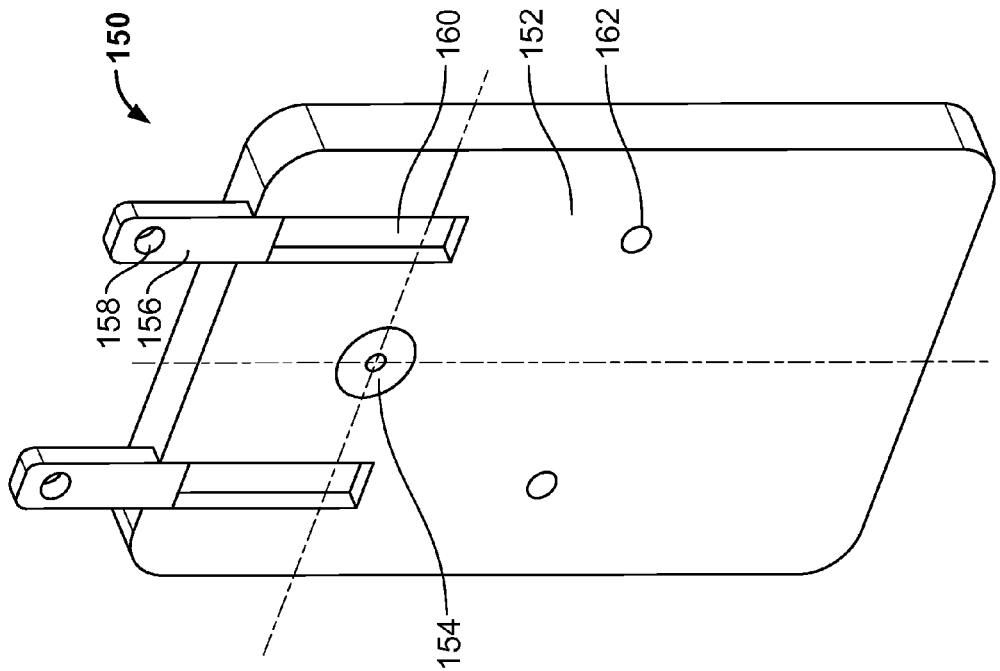

FIGS. 1A-1D show example mobile devices having various flash configurations. Referring specifically to FIG. 1A, a system 100 is shown that includes a mobile computing and communication device in the form of a smartphone 102. In this example, the smartphone 102 is shown from its back side, which is opposite to a display screen (not shown) that may be positioned on a front side of the smartphone 102 in a familiar manner. Generally, the back side of the smartphone 102 is flat, so as to give the smartphone a relatively thin cross-section (when viewed from the side), and to allow the smartphone to be laid flat on a surface such as a desk or other similar surface conveniently.

The smartphone 102 is defined at its perimeter by a housing that may include two or more sheets of material that have been pressed or otherwise formed to lock together with each other and to form a void inside the smartphone 102, where electronics, batteries, and other appropriate mechanisms may be housed. In this example, the housing takes a simple form of a three-dimensional rectangle having front and back sides that are essentially flat, and having slightly chamfered corners to create a pleasing look for the smartphone 102 and also to make it easy to handle it. The housing may also be penetrated at various points, such as by a display screen, a keyboard, communication and charging ports, a trackball, and other such familiar mechanisms. The smartphone 102 may be approximately a quarter- to half-inch think, two to three inches wide, and three to four inches long. Also, although each of the examples discussed here shows a rectangular device in a portrait orientation, other devices may take other forms and may be used in a landscape or other orientations.

Various apertures may be provided through the housing of the smartphone 102 for the passage or mounting of components of the systems used in the operation of the smartphone 102. For example, though not shown here, one such group of apertures that may be provided in the housing include holes through which physical keys in a keyboard and other input mechanisms such as trackballs and pointers may extend. The mechanisms may be held in place so they stay substantially within the housing at one end, and yet can be manipulated by a user of the smartphone 102 in familiar manners. As shown in FIG. 1A, apertures are also provided for a camera lens 104, and for camera flashes 106 and 108. The flashes 106 and 108 may take the form of light emitting diodes (LEDs) that have flat surfaces to stick through the apertures and that sit essentially flush with an outside surface of the housing. The LEDs may be bare outside the housing or may be provided with protective, though transparent, covers.

The lens 104 may also extend through an aperture in the housing, and may extend slightly from the back side of the housing if such additional room is needed for the optics of the lens 104 to operate properly. In certain embodiments, the lens 104 may be movable, and may normally be covered by a closable lens cover, and then extend out of the housing when the cover is moved to the side and the lens is needed to focus properly on objects in the field of view of the smartphone 102.

In the figure, imaginary lines or dashed lines are shown to represent a horizontal axis 110 and a vertical axis 112 through the lens 104. In this example, the axes 110, 112 are at a right angle to each other, although the lines representing the axes are not at a right angle in the figure because the figure is a perspective view of the system 100. The axes 110, 112 are shown here to assist in explaining the positional relationship of the flashes 106, 108 relative to each other. In particular, by crossing at a right angle, the axes 110, 112 form four right-angle quadrants centered on a center point of the lens 104. The flashes 106, 108 are in two of the opposed quadrants, such as the first and third quadrant, which are not adjacent to each other but are instead separated from each other by the other two quadrants.

Such a definition of the positional relationship of the flashes 106, 108 (in opposed quadrants) results in the flashes 106, 108 being located in a spaced-apart relationship from each other, in juxtaposition to flashes that would instead be located immediately adjacent to each other and on a single side of the lens 104. For example, the flashes 106, 108 could instead be located immediately adjacent to each other if they were both located on one side of the lens 104, such as with flash 106 immediately above the axes 110, and flash 108 immediately below the axis 110. In other example, the spacing may be referenced according to a radial number of degrees between the flashpoints in two directions around a centerpoint of the camera lens, where the two directions—an included angle and an excluded angle together equal 360 degrees. For example, where the flashpoints are at the corners of a imaginary square centered on the lens, the included angle between adjacent points would be 90 degrees, and the excluded angle would be 270 degrees. In other examples, the included angle between adjacent flashpoints around the center of the lens may be 45 degrees or more, including at 60 degree, 90 degrees, 120 degrees, 135 degrees, 150 degrees, and 180 degrees.

The positioning of flash 106 and flash 108 with respect to each other in this example, however—in opposed quadrants—causes the light from the flashes 106 and 108 to cross over the view of the lens 104, and to thereby cancel out shadows that may be cast by a subject of a photograph being captured by the lens 104. As a result, the visual appearance of the captured digital image for the photograph may be improved by such relative positioning of the flashes 106, 108 relative to each other and relative to the lens 104.

Referring now to FIG. 1B, another system 120 is shown by which a smartphone 122 may be used to capture images that have been lit from multiple directions by flashes 126-132. In this example, a lens 124 is centered laterally on the smartphone 122, though closer to the top edge of the smartphone 122 than to its bottom edge. Again, however, the lens 124 is located on a back surface of a housing of the smartphone, on a side opposite to a touchscreen and/or keyboard provided on the smartphone 122. And again, a horizontal axis 134 is shown by an imaginary line, and a vertical axis 136 is shown by another imaginary line, both passing through a center point of the lens 124, and together defining four equally-sized quadrants.

Four different flashes 126-132 are shown also exposed through apertures on the back side of the housing of the smartphone 122. The flashes 126-132 may be, for example, LEDs that are pushed through the back of the housing and mounted to a printed circuit board behind the housing wall and inside the housing.

A pair of flashes 126, 128 are located in the upper corners of the housing for the smartphone 122. The flashes 126, 128 are symmetric about a central vertical axis of the smartphone 122 on each side of the lens 124, but are located approximately one inch, or less than one inch, above the center of the lens 124, and near the top of the smartphone 122. A second pair of flashes 130, 132 is located vertically in line with the first pair of flashes 126, 128, but lower on the body of the smartphone 122. In particular, the lower pair of flashes 130, 132 is located approximately one to two inches below the center of the lens 124. However, the flashes 132, 132 are located sufficiently high on the housing of the smartphone 122 so that, when a user grasps the smartphone 122 in a normal manner around the bottom of the smartphone 122 (shown by the left hand of a user gripping the device), the flashes 130, 132 are not covered by the user's hand. In this manner, the flashes 132, 132 are located as far from the lens 124 as is practical, and may thus be able to cancel shadows more effectively that are created as a result of flashes 126, 128.

Thus, in this figure, flashes are located in all four of the quadrants defined by the horizontal and vertical axes 134, 136, so that there are again flashes in opposed quadrants (twice). For example, flash 126 is in a quadrant that is opposite that of flash 132, and flash 128 is in a quadrant opposite flash 130. The particular manner of representing the quadrants in this example, with a horizontal and vertical axis, is provided merely for illustration. The axes may also be inclined in various manners, and flashpoints may be located in the quadrants formed by the axes so as to be located in opposed quadrants, so as to be more effective in canceling shadows provided by each other and in generating particular effects in images that are captured by a camera connected to lens 124.

Figure 1C:
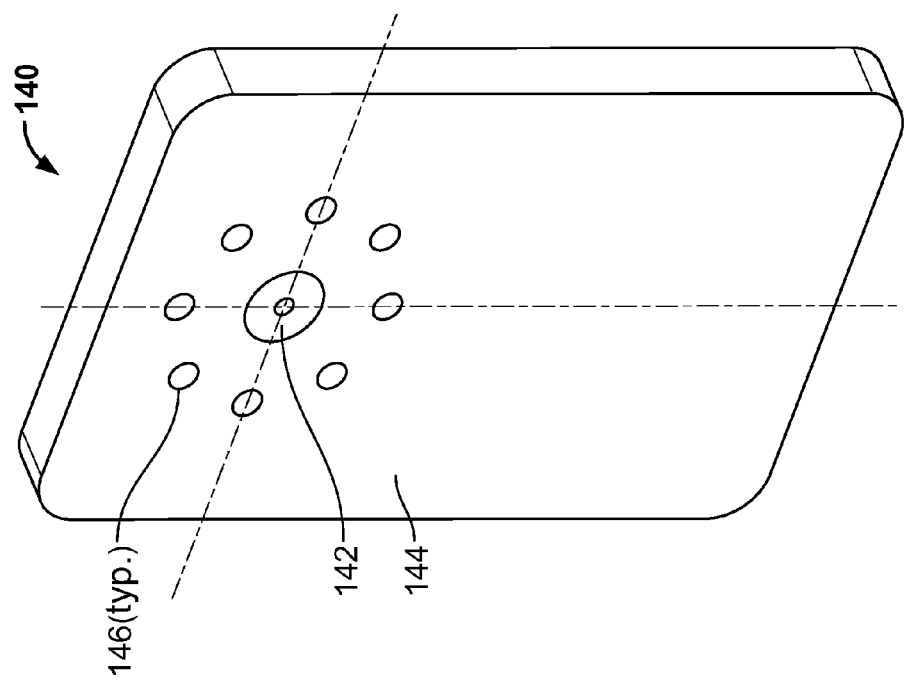

FIG. 1C shows another lens and flash implementation on the back side 144 of a camera phone system 140. In this example, the lens 142 is located in a position that is similar to that of lens 124 in FIG. 1B. However, eight separate flashes 146 are located in a radial array around, and at equal distances from, the center of the lens 142. Light is provided a symetric manner from eight different points around the lens 142 so as to provide a more complete and blanketed lighting effect for an object that is subject to being captured by a camera in smartphone 144. In such an arrangement, the flashes 146 may be sequenced radially while maintaining the lens on the camera open for a long-exposure image capture. Such sequencing may be used to create particular effects in the image that is captured.

Also, the lighting on a subject may be determined immediately before capturing an image (e.g., after a user presses the shutter) in each of the examples in this application, and the selection and sequencing of which flash or flashes to trigger may be selected based on analysis of the lighting. For example, if the subject is lit naturally from the right (e.g., via the sun), the leftmost single flash, three flashes, or five flashes may be triggered as a single flash for a single image capture, or as multiple instances of flashes in various combinations with multiple image captures in close succession (e.g., in less than 1 second). Similarly, any flash or flashes on a side opposite the side on which natural light is determined to be shining may be flashed.

In certain implementations (whether with the eight flashes 146 of FIG. 1C or with other numbers of multiple flashes), the positions of particular pairs of the flashes 146 (which may also be referenced as flashpoints when referring to the particular locations at which they emanate light toward a subject) can be expressed as being on opposite sides of the lens 142. For example, the flashes 146 may be positioned so that an imaginary line (like the imaginary quadrants discussed above) drawn through the center points of the flashes (in the plane of the back side 144 of the device) will pass through at least a portion of the front face of the lens. Or an imaginary line drawn through the center of the lens 142 may pass through at least a portion of two flashes 146 that are located on opposed sides of the lens 142. Similarly, the flashes may be located in zones created by lines that intersect through the middle of the lens, where the zones are not quadrants (i.e., zones having 90 degree angles). As one example, the angles defined between the intersecting lines for the opposed areas in which the pair of flashes 146 are located may be about 80 degrees, about 70 degrees, about 60 degrees, about 50 degrees, about 40 degrees, about 30 degrees, about 20 degrees, or about 10 degrees. In other implementations, the radiant angle around the lens 142 between a first flash and one or more other flashes may be sufficiently large—and the distance of the flashes from the lens sufficiently great (e.g., closer to the peripheral edge of the back side of the device than to the lens)—so that sufficient differential lighting may be obtained to improve the lighting of a single image to a noticeable degree for a typical person viewing of the image, or to throw sufficiently different angles of lighting on one or multiple images so as to permit the automatic image process techniques described in more detail below.

FIG. 1D shows another implementation by which flashpoints on the back side 152 of a smartphone system 150 may be provided. In a normal deployment, the flashes in system 150 may be positioned like the flashes of system 120 in FIG. 1B. Specifically, flashes such as flash 158 and flash 162 may be located in a square or rectangle around a lens 154, in each of the four quadrants around the lens 154, with the top flashes near the top of smartphone housing.

Moreover, as shown in FIG. 1D, two of the flashes at the top of the device, such as flash 158, are positioned on extendable bars 156 that slide in channels 160. Thus, the bars 156 may be slid upward by a user and locked into an extended position while the flashes 158 maintain electrical contact with the camera control mechanisms in the telephone device. In this manner, a user of the device, when they want to capture an image and maximize their shadow cancellation, may slide the bars 156 upward, thus causing the flashes 158 to be located farther from the center of lens 154. When the user is done taking a photograph or photographs, he or she may then slide the flashes downward and back into the housing.

Other arrangements for providing multi-position flashes or flash points with respect to a lens on a device may also be provided, and the particular implementation here is discussed as one basic example. In other implementations, for example, larger portions of the phone may be slid outward relative to a lens, so that the sliding portions are stronger and less likely to break free from the telephone under rough handling.

FIG. 1E shows a plan view of the back side of a smartphone system 170. In particular, in this implementation, flashes, such as flash 176, are located at each of the cardinal directions around a lens 178. To that extent, the positioning of the flashes is like that shown in FIG. 1B.

However, to provide for a more dispersed lighting effect for photographs generated by the device, light diffusers, such as diffuser 174 are connected to each of the flashes, and extend along slots provided on the back surface 172 of the housing for the device. In particular, the diffuser 174 may be made of a lightly smoked colorless plastic that is able to diffuse light generated at its center by light source 176 further out toward its ends. As a result, a ring of light may be formed around the lens 178 when a photo is snapped, and may thereby create a desired light effect for a picture taken by the device. Such an approach thus has four flashes but a more distributed flash surface rather than mere flash points.

FIG. 1F shows another plan view of the back side 182 of a smartphone system 180. The layout of four separate flashpoints in this example, such as flashpoint 186, is similar to that shown for system 120 in FIG. 1B. In particular, the flashpoints are positioned in a rectangle or square at roughly equal distances around and away from a lens 184. In this example, however, the flashpoints, including flashpoint 186, are not coincident with the light sources that serve the flashpoints. Instead, the flash or light source 189 is a single centrally-located light source that is in turn connected to the flashpoints by way of light pipes, such as light pipe 188. In certain examples, the light pipes may be adhered to an inner surface of the back side 182 of the device housing. Alternatively, channels or grooves may be formed on the inside surface of the housing, and optical materials may be placed in the channels to make a connection between the light source 189 and each of the flashpoints. Mirrors may be provided at each of the flashpoints so as to direct light from the light pipes into a direction that exits through the apertures that are provided for the flashpoints in the housing (i.e., to bend the light 90 degrees). In addition, the optical material may be placed on the outside of the housing and may emit some slight from its edges so as to create a distributed lighting effect similar to that discussed with respect to FIG. 1E.

In this way, a distributed lighting effect may be provided with a device such as a smartphone, but without having to provide multiple light generators or light sources for such an implementation. Such a system may have various benefits, including by saving money and space by providing a single light source, and also by providing for photographic effects that are discussed more fully below, particularly with respect to FIGS. 3 and 4.

Figure 2:
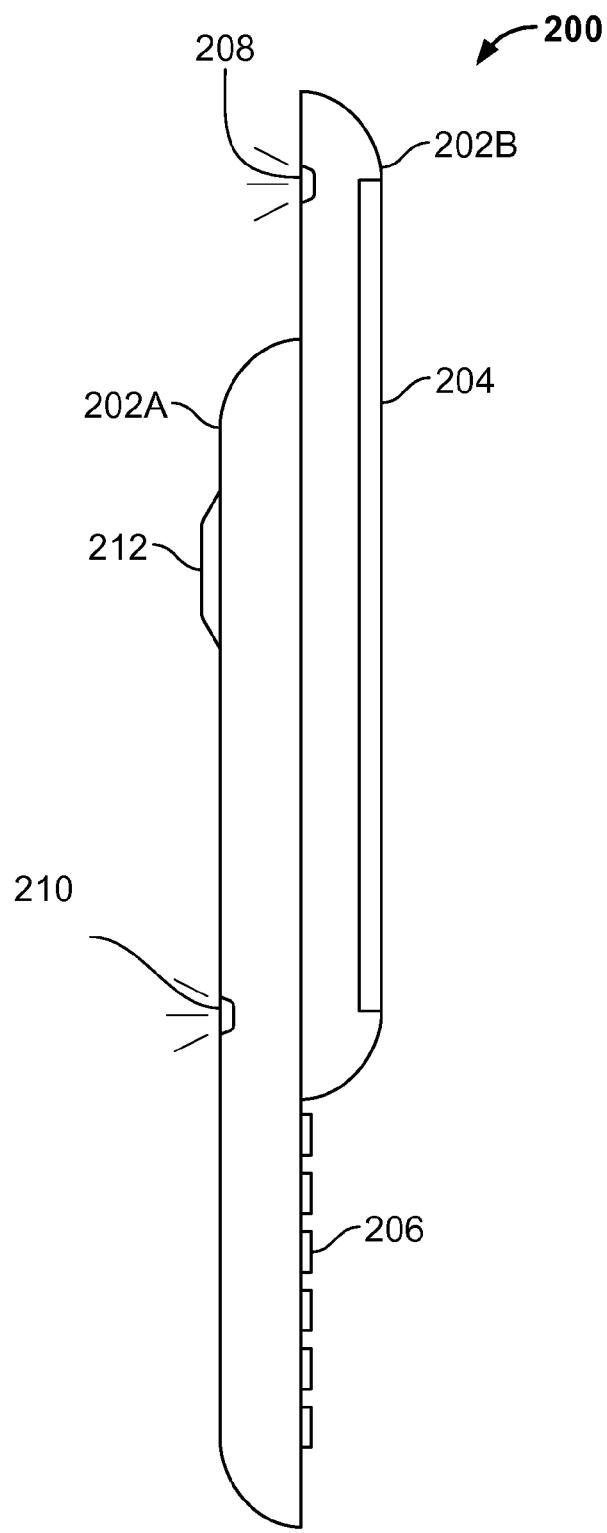
FIG. 2 shows a side view of a slider smartphone having distributed flashpoints.

FIG. 2 shows a side view of a smartphone system 200 that has multiple flashes around a camera lens. In this example, the device is implemented as a slider-based smartphone device in a familiar manner, in which a housing for the device has a front portion 202B and a rear portion 202A that are connected together, but that can be slid relative to each other. Such sliding motion allows the two portions (202A, 202B) of the housing to be aligned with each other when the device is closed, and to have one of the portions slid upward relative to the other portion to open the device, such as to expose a physical keyboard 206 and other input mechanisms for the device on a front side of the rear portion 202A. In this example, the camera lens 212 is again located near the top part of the device, and centered in a back wall of the device on the back portion 202A of the housing (though it could be located in a back wall of the front portion 202B). One or more flashes, such as flash 210 are located in the back portion 202A of the housing at a position such as that shown for flashes 130 and 132 in FIG. 1B. Separately, a flash 208, or pair of flashes, is located in a back surface of the front portion 202B of the housing. When the device is closed, the flash 208 may be covered by the back portion 202A of the housing, and the flash 208 may be disabled if a user attempts to capture an image in the closed position. However, when the phone is opened, by sliding portion 202B upward, and thereby uncovering the flash 208, a camera application installed in the device may cause the flash 208 to be triggered whenever the camera in the device is triggered to capture an image. In this manner, the system 200 provides the user with options in how to capture images, where, in a first mode, a device may use one or two closely-located flashes on one side of the lens 212, but in a second mode, additional flashes may be uncovered and made active so as to provide additional lighting effects for images captured by the system 200.

Figure 3:
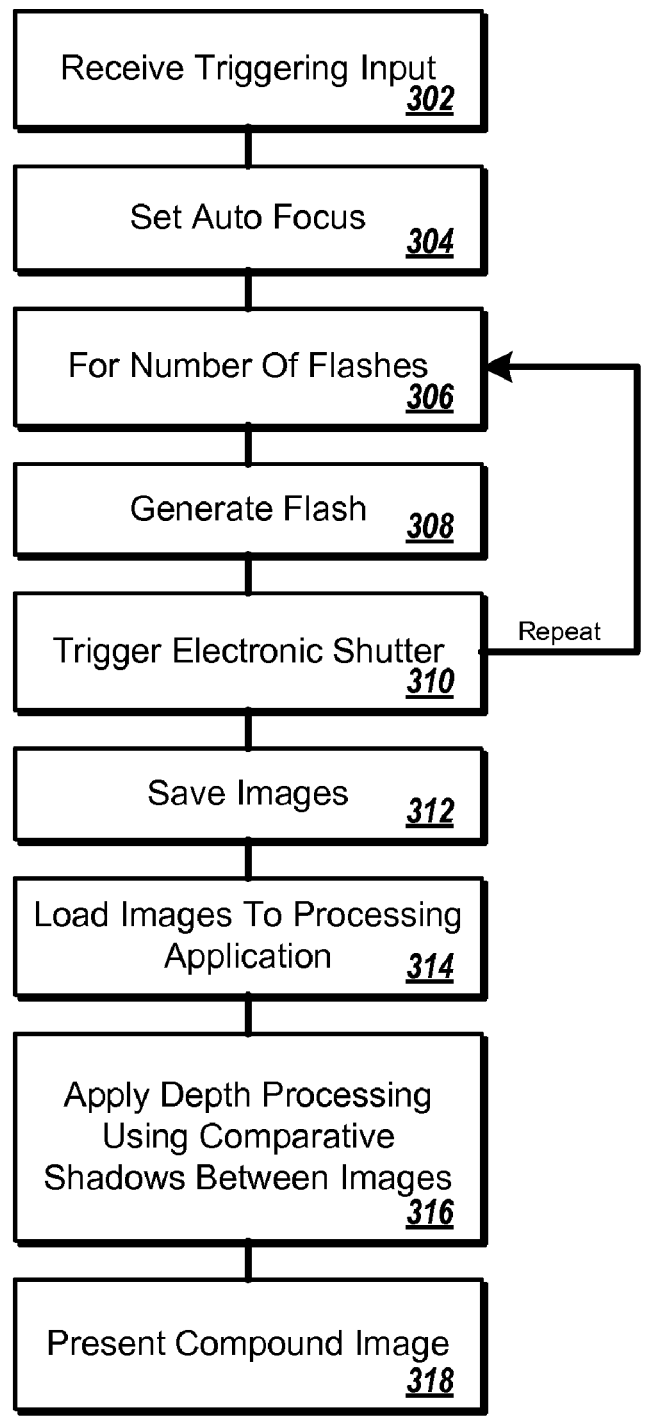
FIG. 3 is a flowchart of a process for capturing and processing images using a device having multiple flashpoints.

FIG. 3 is a flowchart of a process for capturing and processing images using a device having multiple flashpoints. In general, the process involves capturing a multitude of images using a computing and communication device like the devices shown in FIGS. 1A-1F, where multiple flashpoints are provided around a lens on the device. Each of the captured images may be lit in a different manner using one or more of the available flashpoints, where each image is lit by a different flashpoint or combination of flashpoints. The images may also be captured in quick succession (e.g. less than 0.5 seconds, 1 second, or 2 seconds for all of the captured images), so that a subject of the images does not have time to move in a substantial manner across the images, and to thus change the way the subject looks in the succession of images (though if movement does occur, post-processing may be used to identify the moving features and to select a feature from one of the images so as to avoid blurring or similar effects, unless certain of such effects are desired in the particular situation).

The process starts at box 302, where a triggering input is received on a device such as a smartphone having a built-in camera and image capture software application. The triggering input may generally occur by a user pressing a physical or virtual button that represents a shutter triggering mechanism for the device. For example, a button may be generated as an icon on the display of the device, and a user may press the button, where the display is a touch-sensitive touchscreen display. In other implementations, the triggering input may be generated by a timer or other mechanism that operates in a familiar manner.

At box 304, the autofocus for the device is set. Such an operation may occur by various well-known mechanisms, and may rely on standard componentry that has been added to the device, such as chipsets that are dedicated to image capture for camera phones. The device may also determine whether flash will be needed and may begin charging capacitors or other energy storage mechanisms for the flash or flashes.

With the autofocus set and the energy storage devices charged, the process begins capturing multiple images with different lighting presentations on each of the images. In particular, at box 306, the process begins counting a number of cycles to which the process has been set, where each cycle includes capturing an image (e.g., loading a charge coupled device (CCD) and reading data from the CCD) while simultaneously and in coordination activating one or more flashpoints surrounding a lens on the device for each captured image (box 308). Each of the actions in boxes 306 to 310 may then be repeated for as many times as the device is set to capture images of a particular object. For example, a particular device may include flashpoints at each of the four cardinal directions, so that four separate images may be captured, where each of the four flashpoints is triggered individually for one of the corresponding captured images. The images may be captured as quickly as the particular device is able to fill and clear a CCD, typically multiple captures per second. As a result, the device and process will then have stored four digital files, in which shadows are cast in slightly different directions for each of the images in the files.

In other implementations, the flashes may be triggered out of the direct sequential orders and the number of triggered flash points may differ from the number of images that are captured. For example, where there are eight flashpoints and eight flash events, the triggering sequence may be 1, 3, 5, 7, 2, 4, 6, 8. Alternatively, points 1 and 2 may be triggered together, then 3 and 4, and so on. Or opposite points may be triggered at the same time, such as in a 4-image capture that use 1 and 5, 2 and 6, 3 and 7, and 4 and 8. As examples in which the number of captured images and flash events does not match, a device having eight flashpoints may capture five images, where one of the images is unlit and the other four use flashpoints at the 1, 3, 5, and 7 positions or paired flashes of the flashpoints at the 1 and 5, 2 and 6, 3 and 7, and 4 and 8 positions.

At box 312, the images that have been captured are saved, such as by moving image data for the images out of a buffer that permits the images to be captured in close succession to each other, and into a more permanent form of storage, such as to an SD card on the device or in other familiar mechanisms.

With each of the relevant images captured and stored, a mobile device that captured the images, or another computing device, may operate to process the images in various manners. One example of such processing is known as high dynamic range (HDR) processing. In such processing, multiple images may be captured in a single subject, where the conditions for each of the images changes slightly. For example, auto exposure bracketing (AEB) may be used to automatically and in close succession take multiple images with a camera, where each image is taken with a different exposure setting. Such capturing of images in the examples discussed here may also be accompanied by variability in the flashpoints that are triggered for each of the images (e.g., a different flashpoint for each different exposure). As a result, each of the captured images, although showing the same subject, will be presented in a different manner due to the variation in exposure settings and flash usage.

Such images may thus be post-processed and elements of the separate images may be merged to create a processed image that has unique characteristics that are not present in any of the individual images. HDR processing techniques are known, and the post-processing using such techniques may occur on the device that captured the images, such as a smartphone, or on another device.

The presence of shadows in the different images may also be used upon loading and analyzing each of the images (boxes 314 and 316). For example, the location and length of the shadows may be used to determine relative distances from the camera to an object or objects in an image, and the use of multiple flashes and multiple photos may be employed to improve the degree of accuracy with which the depth may be determined by the device that captures the images. Such processing may, for example, be used to create a composite image that does not include the shadows, but that is annotated with renderings (multi-color shadow lines) for creating a three-dimensional display, where users who wear appropriate glasses can see additional simulated depth in the display. Thus, at box 318, the process may present a compound image that incorporates such processing of features that are unique to each of multiple captured images of a single subject, but that are combined in appropriate manners into a final process image.

Figure 4:
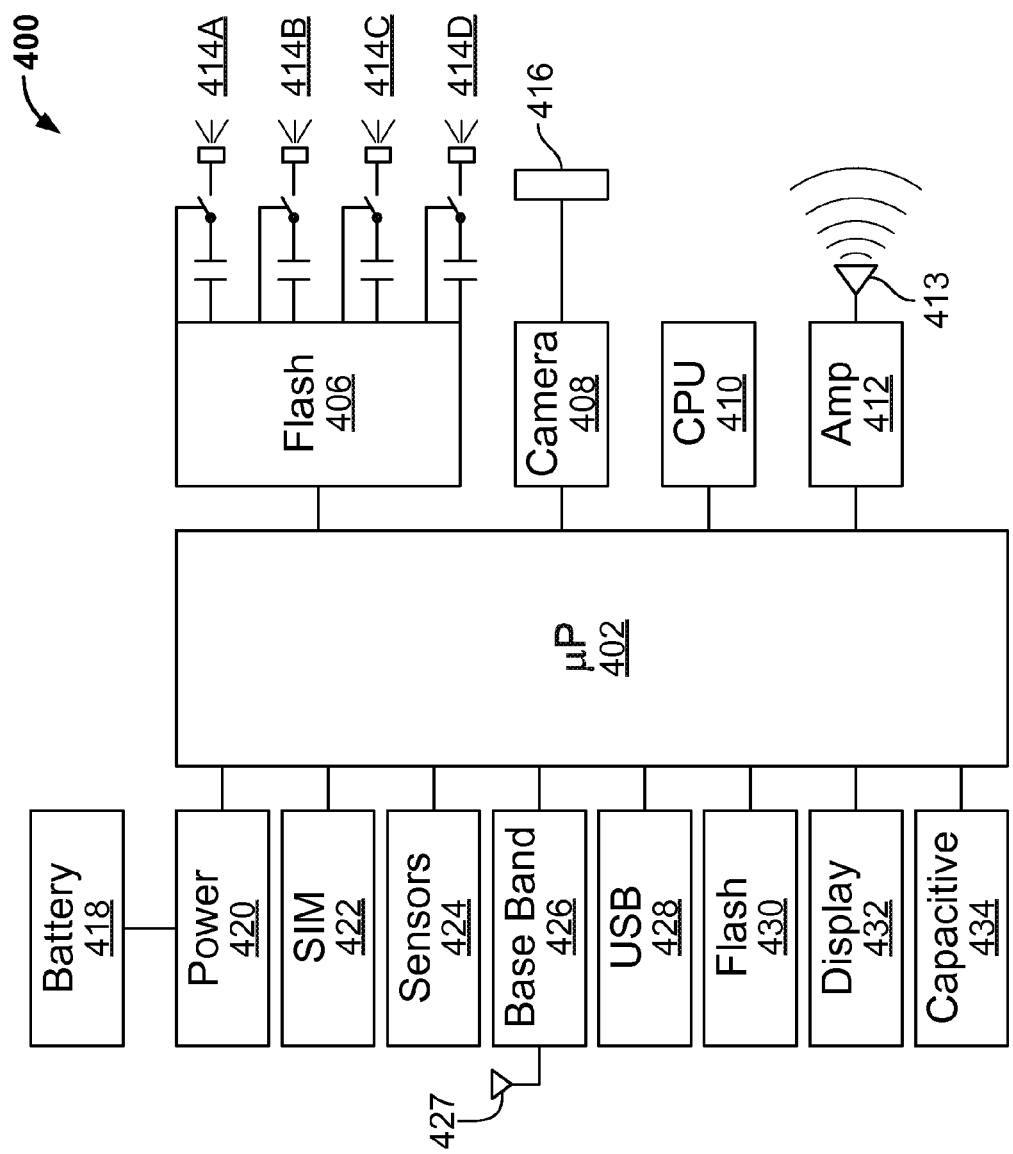
FIG. 4 is a partial schematic diagram of a mobile communication device for capturing images using multiple flashes.

FIG. 4 is a partial schematic diagram of a mobile communication device 400 for capturing images using multiple flashes. In general, the device 400 includes a number of components that cooperate with each other in a portable device such as a smartphone, to provide a variety of services to a user of such a device. As one example, the device 400 may download a certain number of applications or apps that are provided by third parties or that are provided with an operating system that is executing on the device 400. One such application or applications may include one or more photo capture applications and photo processing applications, which are designed to control the operation of a physical digital camera that is part of the device 400 and to process images individually or in combination that are captured by the device 400.

Referring to particular components of the device 400, a microprocessor 402 is shown as communicating with a number of the components on the device. The microprocessor 402 may, for example, load instructions and other data (e.g., data from a camera and/or of images that were previously captured but have since been stored) from memory such as flash memory 430 and other forms of memory that are part of the device 400. The microprocessor 402, in executing the instructions, may draw power from a power supply 420 that regulates the delivery of power from a battery 418. The particular arrangement for the memory 430 and the power supply 420 and battery 418 are not critical here, and may take a variety of well-known forms.

Other standard components that communicate with the processor 402 include a subscriber identity module (SIM) card 422 that may be inserted into the device 400 and may control the manner in which the device 400 communicates with various wireless networks. For example, the SIM card 422 may control what network the device 400 communicates with, and the manner in which the device 400 identifies itself (and by extension, its user) to the network. Similarly, a USB port 428 may be provided on the device and may be used to communicate with other devices wirelessly, such as a laptop or tablet computer that is physically connected to the device 400.

The device 400 may also communicate by way of a baseband module 426 and through an antenna 427. The baseband module 426 may typically be implemented as a standard module or chipset that is available from various chipset manufacturers and may be communicated with according to a standard application programming interface (API). The baseband module 426, for example, may communicate with 3G or 4G networks with voice or data, or voice encoded as data where the data-encoded voice is not differentiated on the network from other data (other than perhaps being prioritized). Again, the particular implementations of the components discussed here are generally well known and may be employed in various manners.

Also shown communicating with the processor 402 is a display manager 432 and a capacitive touchscreen input manager 434. The display manager 432 may manage what information is shown to a user via a display screen on the device 400. For example, an operating system on the device 400 may employ display manager 432 to arbitrate access to the screen for a number of applications that are running on the device 400. In one example, the device 400 may display a number of applications, each in its own window, and the display manager may control what portions of each application are shown on the screen, based on the positions of the applications and what application is currently the focus of the operating system.

The input manager 434 may control the handling of data that is received from a user via the screen (where it is a touchscreen, such as a capacitive touchscreen) or other input mechanisms. For example, the input manager 434 may coordinate with the display manager 432 to identify where, on the display, a user is entering information so that that the device 400 may understand the context of the input. The input manager 434 may also interpret swiping inputs and other inputs, and may, for example, provide an indication of the starting and ending point of a swiping input and may pass to other components a direction of the input (which may be in compass degrees, with the top of the device as North, or by other similar mechanisms). In addition, the input manager 434 may determine which application or applications should be provided with the input. For example, when the input is provided within a text entry box of an active application, data entered in the box may be made available to that application. Likewise, applications may subscribe with the input manager 434 so that they may be passed information entered by a user in appropriate circumstances.

In addition, the device 400 may be provided with one or more sensors 424 which may be part of a common sensor package that may be obtained from a third-party source. The sensors 424 may include, for example, accelerometers, gyroscopes, inclinometers, and magnetometers, among others. These sensors may be used to determine a position and orientation of the device, in addition to movement that is being made by the device. Such a sense of motion of a device may be used in combination with other components to identify intended inputs by a user of the device. For example, shaking of the device or other predefined motions may be interpreted by the device as particular inputs (where the commands indicated by each motion-based input may depend on which application is the focus of the device), such as to flip from photo to photo in a photo display application by a quick shaking of the device 400.

In addition, the sensors 424 may include global positioning system (GPS) sensors. Such centers may be used to identify a latitude and longitude or other geographical location indicator for the device 400, and such information may be automatically added to an image file each time an image is captured by the device 400, so as to create automatically geocoded images with the device.

An amplifier 412 may be driven by the processor 402 to create audible noise through speaker 413. The speaker 413 may include, for example, a low-sound-level speaker that a user may hear when they press the device against her ear, or a higher-sound-level speaker that the user may hear when they are listening to music on the device 400 or have the device 400 arranged as a speaker phone when talking on a telephone call.

A graphics processing unit 410 may operate in conjunction with the processor 402, to perform particularly intensive graphics operations, and to thereby offload processing load from the processor 402. As a result, the device 400 may be able to execute complex graphical operations without loading the processor 402, which may result in a better user experience with the device 400 or an accessory operating with the device 400.

A camera module 408 may be a dedicated chipset that is connected to a camera 416. The camera 416 may include a lens, a charge coupled device (CCD), auto-focus mechanisms, and other appropriate mechanisms for capturing digital images with the device 400. Camera module 408 may be provided by a third-party in a familiar form, and may be provided with various built-in processing capabilities, such as the ability to generate raw or JPEG file formats, to perform basic image processing such as lightening or darkening images, red-eye reduction, or cropping images, or other similar basic processing. Also, the camera module 408 may be programmed to communicate with a remote server system so as to automatically cause images that have been captured by the device 400 to be uploaded through a data network to the remote server system. Such uploading may occur after basic processing has been performed by the camera module 408, and may be performed with minimal user intervention, such as by the user simply selecting an on-screen icon of a hosted service to which an image is to be uploaded. Such uploading may occur automatically where the device 400 is previously logged in to an image server system, such as through a wireless network to which the device 400 has made a connection.

A flash module 406 may communicate directly with the camera module 408 or communicate through the processor 402 so as to operate in conjunction and coordination with the camera module 408. In particular, when the camera module 408 is set to capture an image from the camera 416, the flash module 406 may be triggered to operate one or more of the flashes 414A-D.

The flash module 406 in this example is shown as controlling the triggering of four different flashes 414A-D. The flash module 406 may be implemented with four separate capacitor 413, with one capacitor for each of flashes 414A-D. The flash module 406 may also be connected to control switches 415 to trigger the discharge of the capacitors through the flashes 414A-D. The particular arrangement of the switches 415 and capacitors 413 or other energy storage components that energize the flashes 414A-D, may vary from that shown here. It can be selected, for example, to meet the particular capabilities of other components in the system, the available space and layout parameters for the system, and the like.

The flash module 406 may be controlled in particular ways in response to inputs provided by a user of device 400 on a touchscreen or by other similar mechanisms. For example, where a user chooses to trigger only a single flash, such as flash 414A, the flash module 406 may be instructed to charge only the capacitor 414A, and to trigger a switch attached to capacitor 414A in coordination with capturing of an image by camera module 408. Alternatively, if sequential imaging has been selected by a user of device 400, the flash module 406 may be programmed to trigger each of flashes 414 A-D sequentially to correspond to the capturing of one out of four images by camera 408. As one example, where the flashes 414A-D are arranged around the periphery of a lens of the camera 416, the flashes may be triggered in a particular direction, and the shadow cast by a subject in the image may rotate around the opposite side of the subject as compared to the flash side on which the flash is currently being triggered.

When the images are captured, such as when a plurality of images of a single subject are captured in close succession to each other (e.g., 4 images in less than a second), the camera module 408 and the processor 402 may cause the images to be uploaded to a server system or other device for processing, or may themselves perform such processing. Examples of the processing that may be performed by such systems is described in more detail above.

A number of structural components on the device 400 have been described here, though other components may be added, the components may be combined in various manners, or certain of the components may be eliminated in a particular implementation. As one example, various types of memory may be provided on the device, including replaceable memory cards so that a user can select the level of memory he or she wants for the device. Also, certain of the functionality provided by the separate components described here may be implemented through software that is loaded onto and executed by the processor 402. A particular implementation of the processes described in this application, whether in software, hardware, or firmware, is not critical.

Thus, using a system like that shown for device 400, a user may be provided with mechanisms for actions that may be performed under simple control of the user, such as the user selecting a menu item to capture multiple images with multiple different coordinated flashes, and may occur essentially automatically, such as by device 400 automatically and sequentially capturing the image is well triggering corresponding flashes in close succession in response to a user pressing a shutter button. As a result, the utility of device 400 for a user of the device 400 may be improved and the user's satisfaction with the device may increase.

What is claimed is:

1. A mobile communication device, comprising:
    a wireless communication interface arranged to transmit and receive data with a wireless data network;
    a microprocessor;
    memory in operable connection with the microprocessor storing a plurality of separate computer applications that are each configured to perform one or more particular operations, wherein the plurality of computer applications include a digital image capture computer application that is configured to cause digital images to be captured locally by the mobile communication device and share the captured digital images with one or more of the other computer applications of the plurality of computer applications;
    a housing at least partially surrounding the wireless communication interface, the microprocessor, and the memory and defining an outer surface for the mobile communication device;
    a camera lens in an aperture in the housing and arranged on a first side of the mobile communication device and located at least partially in the housing, and serving as a centerpoint for an intersection of a pair of axes that define four quadrants; and
    a plurality of flash generating devices on the first side of, and on the outer surface of, the mobile communication device, two of the flash generating devices located in quadrants that are positioned opposite of, and not adjacent to, each other,
    wherein the memory further stores:
        instructions that when executed by the microprocessor cause an analysis of lighting on a prospective subject of a captured image to be performed; and
        instructions that cause one or more of the plurality of flash generating devices to be selected and activated based on the analysis of lighting on the prospective subject of the captured image, wherein the one or more of the plurality of flash generating devices are selected based on i) locations of the plurality of flash generating devices on the first side of the mobile communication device with respect to the camera lens, and ii) a determined direction in three-dimensional space from which an ambient light source is lighting the prospective subject.

2. The mobile communication device of claim 1, wherein each of the four quadrants includes a flash generating device.

3. The mobile communication device of claim 1, wherein each of the plurality of flash generating devices is provided with light from a common source via light pipes.

4. The mobile communication device of claim 1, further comprising a flash controller arranged to trigger the flash generating devices individually in succession to each other, and an image capture application to capture a digital image for each triggering of the flash generating devices.

5. The mobile communication device of claim 4, further comprising an image processing application loaded on the device and programmed to merge portions of the captured digital images by analyzing data created by positioning of each of the flash generating devices.

6. The mobile communication device of claim 5, wherein the image processing device is programmed to perform high dynamic range (HDR) imaging to create a single HDR image using a plurality of images.

7. The mobile communication device of claim 6, wherein the image processing device is programmed to create a three-dimensional representation of a subject of the plurality of images using shadow information from shadows cast in different areas in particular ones of the plurality of images.

8. The mobile communication device of claim 1, wherein, when the ambient light source is determined to be lighting the prospective subject from a side, the one or more of the plurality of flash generating devices that are selected are located on an opposite side with respect to the camera lens.

9. The mobile communication device of claim 8, wherein the one or more of the plurality of flash generating devices that are selected comprise two or more of the plurality of flash generating devices; and wherein the mobile communication device is configured to simultaneously activate the two or more of the plurality of flash generating devices when capturing an image of the prospective subject using the camera lens.

10. A computer-implemented digital image capture method, comprising:

receiving a user trigger on a mobile telephone to take a picture of a subject with a digital camera that is part of the mobile telephone;

in response to receiving the user trigger, automatically capturing one or more images of the subject with the digital camera;

automatically selecting, with the mobile telephone, one or more of a plurality of flash generating devices to activate based on an electronic analysis of lighting on a prospective subject of a photograph to be taken by the mobile telephone, the plurality of flash generating devices being mounted on the mobile telephone and including at least two flash generating devices located in opposed quadrants defined by imaginary lines passing through a center point of a lens of the digital camera, wherein the one or more of the plurality of flash generating devices are selected based on i) locations of the plurality of flash generating devices on the first side of the mobile telephone with respect to the camera lens, and ii) a determined direction in three-dimensional space from which an ambient light source is lighting the prospective subject; and automatically activating the selected one or more of the plurality of flash generating devices in coordination with capturing the one or more images of the subject.

11. The method of claim 10, wherein the plurality of flash generating devices define vertices of a right polygon around the lens.

12. The method of claim 10, wherein the plurality of flash generating devices are located at respective corners of a rectangle.

13. The method of claim 10, wherein one or more of the flash generating devices are movable away from and toward the lens.

14. The method of claim 10, wherein automatically activating the selected one or more of the plurality of flash generating devices comprises sequentially activating the selected one or more of the plurality of flash generating devices in coordination with capturing a plurality of images with the camera.

15. The method of claim 14, further comprising processing the plurality of images to create a single composite image.

16. The method of claim 15, wherein processing the plurality of images to create a single composite images is performed on the wireless communication device.

17. A mobile communication device, comprising:

a wireless communication interface arranged to transmit and receive data with a wireless data network;

a microprocessor in operable connection with memory storing computer applications that include a digital image capture application;

a housing at least partially surrounding the wireless communication interface and the microprocessor and defining an outer surface for the mobile communication device;

a camera lens located on a first side of the mobile communication device at least partially in the housing, and serving as a centerpoint for an intersection of a pair of axes that define four quadrants; and a plurality of flashpoints that are on the first side of the mobile communication device and that are on opposed sides of the camera lens, wherein the plurality of flashpoints provide flash illumination of a subject at which the camera lens is directed, wherein the digital image capture application is programmed to select and activate one or more of the plurality of flashpoints based on i) locations of the plurality of flashpoints on the first side of the mobile communication device with respect to the camera lens, and ii) a determined direction in three-dimensional space from which an ambient light source is lighting the subject.

18. The mobile communication device of claim 17, wherein the computer applications further include a telephone application that communicates using the wireless communication interface.

19. The mobile communication device of claim 17, wherein the means for providing flash illumination generate multiple points of light flashes at points that are at least 60 degrees from each other radially, from both an included and excluded angle, when measured from a centerpoint of the camera lens.

20. The mobile communication device of claim 17, wherein the digital image capture application is further programmed to sequentially energize the one or more of the plurality of flashpoints in coordination with a long-exposure image capture.

* * * * *